July 23, 1968  L. D. MASSER  3,393,774
BRAKE ACTUATING SYSTEM

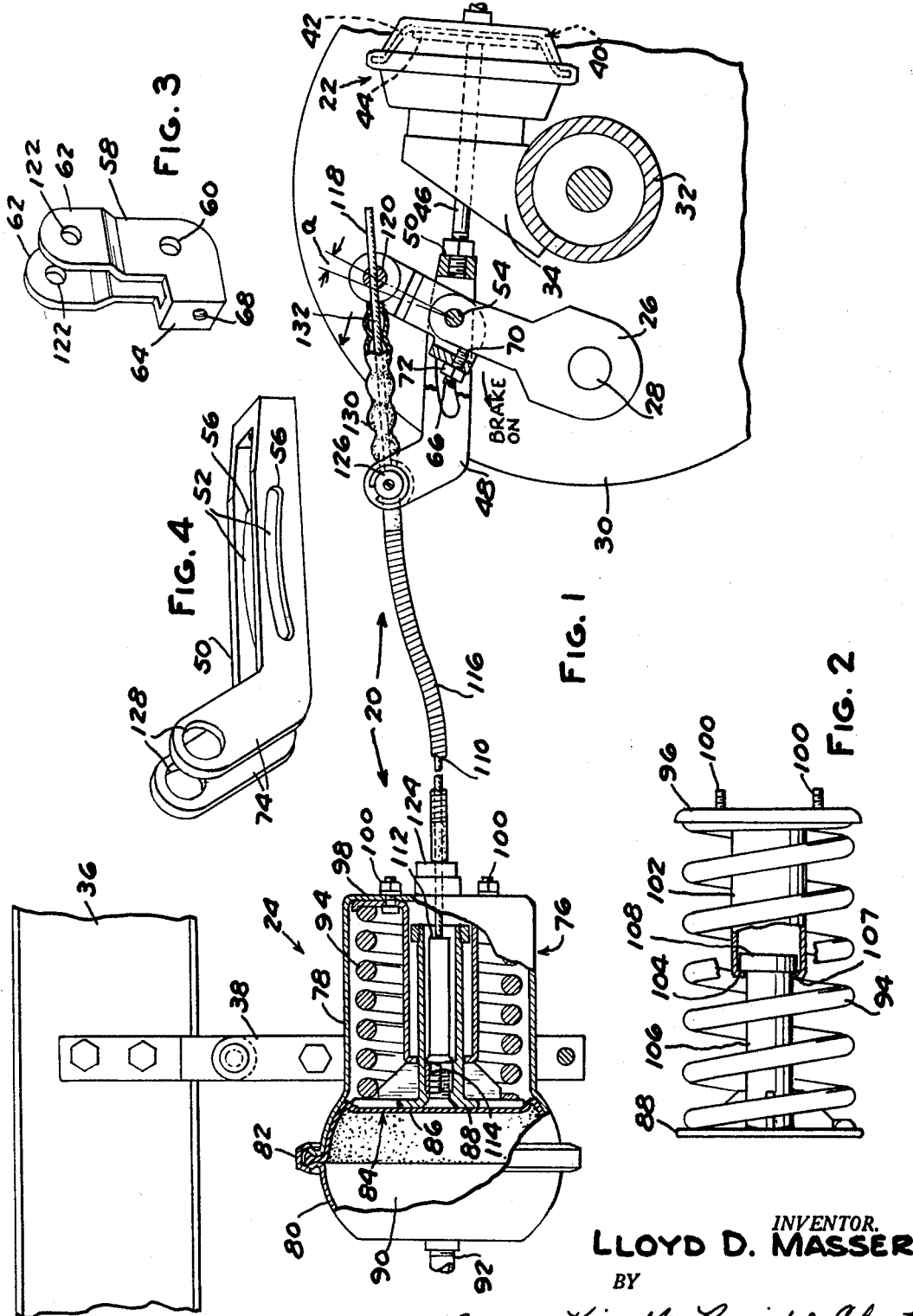

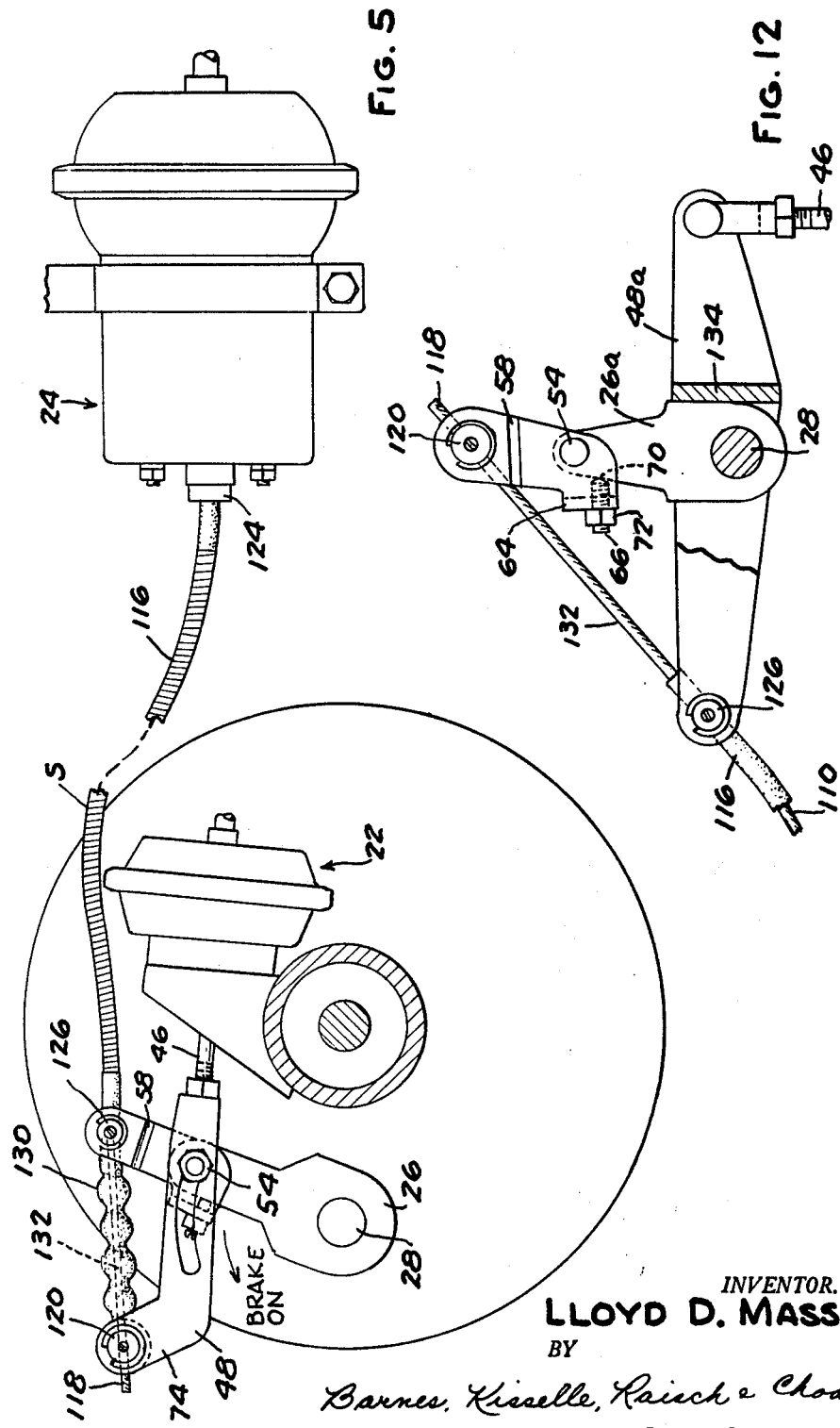

Filed Jan. 3, 1967  3 Sheets-Sheet 3

INVENTOR.
LLOYD D. MASSER
BY
Barnes, Kisselle, Raisch & Choate
ATTORNEYS

United States Patent Office 3,393,774
Patented July 23, 1968

3,393,774
BRAKE ACTUATING SYSTEM
Lloyd D. Masser, Muskegon, Mich., assignor to Neway Equipment Company, Muskegon, Mich., a corporation of Michigan
Filed Jan. 3, 1967, Ser. No. 606,613
19 Claims. (Cl. 188—106)

ABSTRACT OF THE DISCLOSURE

A primary and secondary air brake operator or pot are connected to a brake actuator, the secondary air pot connected by a Bowden cable to a pivoted extension on the slack adjusting lever. Upon loss of air pressure in the brake system, a spring in the secondary air pot applies the brake. The amount of swinging movement of the extension relative to the adjuster is limited so that upon movement of the extension beyond the limit in a brake applying direction the extension and adjuster swing as a unitary lever of increased length to apply brake force and increase the amount of force exerted by the secondary air pot.

---

This invention relates to a brake system particularly adapted for use on commercial vehicles. The system utilizes a primary motor to actuate the brakes under ordinary highway operating conditions and a secondary motor to actuate the brakes under emergency or other extraordinary conditions and for parking purposes. Typically each of the actuating motors comprises what is termed in the art an air pot. The secondary air pot is operably connected to the brake mechanism by means of a cable slidably contained in a flexible but longitudinally substantially incompressible housing or sheath.

One such system is disclosed in Rager et al. 3,144,812. In such a system, the secondary air pot has a chamber which under ordinary highway operating conditions contains air under pressure which acts against a piston to keep a spring compressed. The piston is connected to the brake mechanism through the cable referred to above. When air is valved out of the chamber or lost from the chamber the spring moves the piston to apply the brake During normal highway operation of the vehicle, when the brakes are actuated by the primary air pot there is some flexing and other movement of the cable. This movement frequently tends to place the cable under compressive forces which in turn tends to spread the strands of the cable. This effectively destroys the ability of the cable to transmit accurately a predetermined amount of brake actuating movement to components of the brake mechanism. Also in conventional systems of this sort a relatively large secondary air pot has been required to apply the necessary force to the brake mechanism.

The object of the present invention is to provide a relatively simple inexpensive brake system of the type under consideration improved to eliminate compressive forces on the brake cable and to increase the amount of braking force exerted by a secondary air pot of a given size.

In general, the invention is carried out by providing a pivoted extension on a brake slack adjusting lever. The primary air pot is operably connected with the slack adjusting lever. The cable on the secondary air pot is operably connected with the lever extension. The amount of swinging movement of the extension relative to the slack adjuster is limited so that upon movement of the extension beyond that limit in a brake applying direction the extension and slack adjuster swing as a unitary lever of increased length to apply brake force, thereby increasing the amount of force effectively exerted by the secondary air pot.

The connection between the cable and the lever extension is further from the axis of the slack adjuster than is the connection between the primary pot and slack adjuster. Therefore, when the primary air pot is actuated the first mentioned connection tends to swing further than the second mentioned connection. However, the lever extension swings relative to the slack adjuster in a direction counter to the brake force applying direction to accommodate this tendency toward differential swinging thereby insuring that no compressive forces are placed on the cable.

In the drawings:

FIG. 1 is partly a diagrammatic elevational view of a system according to this invention in use, parts being broken away and shown in section to illustrate structural details.

FIG. 2 is a fragmentary generally elevational view of the spring structure within the secondary air pot.

FIG. 3 is an enlarged prespective view of an extension for the slack adjuster.

FIG. 4 is an enlarged perspective view of a link between operative elements of the primary and secondary air pots.

FIG. 5 is a view partly in elevation and partly in section in general similar to FIG. 1 showing the secondary air pot hooked up in a different manner.

FIG. 12 is a fragmentary partly diagrammatic view illustrating a modified form of the link by which the air pots are connected with the slack adjuster lever.

Figure 6:
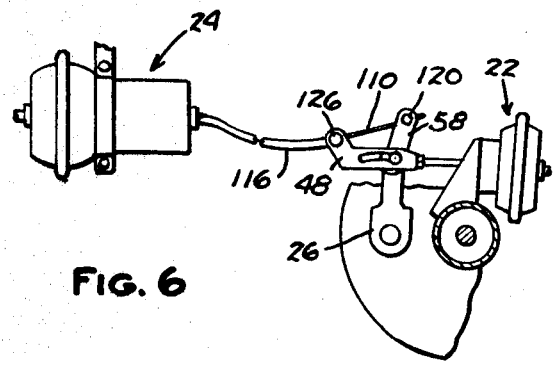
FIGS. 6, 7 and 8 are views illustrating operation of the system when hooked up in accordance with FIG. 1.

Shown in the drawings is a system 20 according to the present invention. The system includes a primary air pot 22 and a secondary air pot 24 both operably connected with a slack adjusting lever 26 secured to a shaft 28 which operates the brake mechanism (not shown) of a wheel 30. Pot 22 is anchored on an axle housing 32 by means of a bracket 34. Pot 24 is mounted on the vehicle frame 36 by means of a bracket 38.

Pot 22 has a piston 40 comprised a diaphragm 42 and a backing plate 44. A piston rod 46 on plate 44 is connected to a link 48 by a threaded connection 50. The link is provided with arcuate slotting 52. A pin 54 which passes through this slotting and an opening in slack adjuster 26 provides a pivotal connection between link 48 and the slack adjuster. When air under pressure is introduced into pot 22 piston 40 is forced to the left as the drawings are viewed and ends 56 of the slotting engage pin 54 and force it together with slack adjuster 26 in a counterclockwise direction to apply the brakes. When air under pressure in pot 22 is relieved the slack adjuster is swung clockwise by a spring in the brake mechanism and this movement returns pin 54, link 48 and piston 40 to the right. The brakes are thereby released.

A lever extension 58 is pivotally secured to the free end of slack adjuster 26 by pin 54 which passes through openings 60 in the extension. Extension 58 is bifurcate (FIG. 3) and straddles the upper end of the slack adjuster. The spaced fingers 62 of the extension are interconnected by a bight 64 disposed adjacent one side of the upper end portion of the slack adjuster. A screw 66 is threaded through an opening 68 in the bight and engages this side portion of the slack adjuster at 70 (FIG. 1). By turning the screw the angular limit of swinging movement of extension 58 relative to slack adjuster 26 in a counterclockwise direction can be adjusted. Screw 66 is locked in adjusted position by means of a nut 72. Link 48 has spaced lateral projections 74 whose function appears below.

Secondary pot 24 has a housing 76 which includes a body 78 and a head 80 secured thereto by a clamp ring 82. A piston 84 in housing 76 is formed by a diaphragm 86 and a backing plate 88. Head 80 and adjacent portions of body 78 define a chamber 90 at one side of piston 84. Air under pressure is introduced into and relieved from chamber 90 through an air line fitting 92. A spring 94 is compressed between piston plate 88 and a retainer plate 96 secured to an end wall 98 of body 78 by bolting 100.

Plate 96 has an inward tubular extension 102 which terminates at an inward shoulder 104. Piston plate 88 has a tubular extension 106 dimensioned to slide through the opening 107 defined by shoulder 104. A retainer ring 108 is removably secured to the free end of piston extension 106 as by threading. Retainer ring 108 has a diameter larger than opening 107 so that the ring and shoulder 104 cooperate to secure plates 88 and 96 together with spring 94 compressed therebetween.

A cable 110 has a fitting 112 at one end anchored to piston plate 88 by a threaded connection 114 (FIG. 1). The cable extends through end wall 98 of secondary pot housing 76. Outside of the pot housing the cable is contained slidably within a flexible but longitudinally substantially incompressible sheath 116 typically formed of coiled wire contained in a protective rubber casing. Cable 110 has an end portion 118 anchored to a pin 120 which is pivotable within aligned openings 122 in fingers 62 of lever extension 58. Cable sheath 116 is anchored to end wall 98 at 124 and is anchored at its other end to a pivot 126 disposed within openings 128 on link extensions 74. A collapsible dirt shield 130 of rubber or the like protects the portions 132 of cable 110 which project beyond anchor point 126 to anchor point 120.

In use it may be assumed that brake actuating system 20 has been mounted on a vehicle in the manner described. To insure proper brake operation it is desirable that lever extension 58 be deposited at a predetermined angle relative to slack adjuster 26 when the brakes are in off condition. This is conveniently accomplished by adjusting extension 58 so that it is in substantially straight extension of the slack adjuster. Different slack adjusters have varying contours with the result than when system 20 is first assembled, extension 58 may be disposed at an angle to the longitudinal extent of the slack adjuster when the brakes are off as illustrated in FIG. 1. If this is the case, nut 72 is loosened and the adjusting screw is either advanced or retracted to swing extension 58 through the necessary angle *a* to position it in straight extension of the slack adjuster. Nut 72 is then tightened to lock screw 66 in the properly adjusted position.

During normal highway operation of the vehicle, to apply service brakes air under pressure is valved into pot 22 to move piston 40, piston rod 46 and link 48 to the left as the drawings are viewed in a generally linear movement. Slot ends 56 push pin 54 to the left thereby rocking slack adjuster 26 counterclockwise to apply the brakes. To release the brakes the air pressure in pot 22 is relieved and the parts return to the right under the action of springs contained in the brake mechanism.

Upon movements of link 48 during this brake operation cable 110 and its housing 116 flex. Also when the brakes are thus applied anchor point 120 between cable end 118 and lever extension 58 swings through a greater distance than does pin 54 because of its greater distance from the axis of shaft 28. Even though the cable and housing flex they offer some resistance to this differential travel. Without the pivoted mount at 54 for extension 58, this resistance would place cable 110 under compression and tend to spread the strands of the cable, particularly in region 132 extending beyond sheath 116.

Under these conditions the cable strands would soon become permanently distorted, the cable would no longer have an effective constant length and the cable would therefore be incapable of exerting a predetermined amount of brake force on extension 58 and slack adjuster 26. However as shown in FIG. 6 when pot 22 is actuated and movement of extension 58 is resisted, extension 58 rocks counterclockwise about pivot 54 with respect to slack adjuster 26. This eliminates the application of any significant compressive forces on cable 110.

Figure 7:
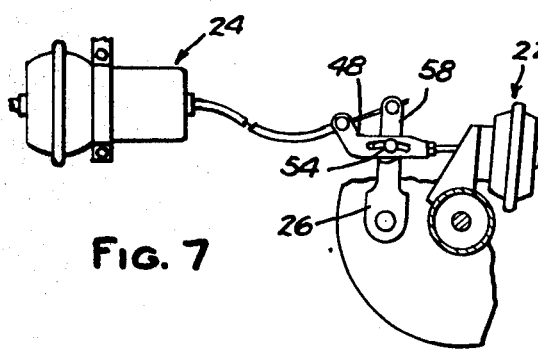

During vehicle operation, if air pressure should be lost to the extent that primary air pot 22 cannot be effectively operated to apply the brakes, pressure is also lost in chamber 90 of secondary air pot 24. When this occurs, spring 94 expands and forces piston 84 to the left to apply brake force. This force is transmitted by cable 110 to lever extension 58. Adjusting screw 66 prevents counterclockwise movement of extension 58 independently of slack adjuster 26 beyond its predetermined setting referred to above. Thus cable 110 swings extension 58 and slack adjuster 26 bodily as a unit in a counterclockwise direction to apply the brakes. This movement is independent of link 48 and is permitted by movement of pin 54 in slots 52. The center of curvature of the slots is at or near the axis of shaft 28 to minimize lateral deflection of piston rod 46 upon movement of pin 54 in the slots. Similarly, pot 24 can be used independently of pot 22 by valving air out of chamber 90 as when the vehicle is parked. The relative positions of the parts under either of these situations is shown in FIG. 7.

The reaction to brake force exerted by secondary piston 84 is received by end wall 98 of the secondary pot housing. This reaction force is transmitted by cable sheath 116 to link 48. Consequently, bracket 38 for the secondary pot bears neither the brake force nor the reaction thereto and need be no stronger or heavier than necessary to support the weight of the pot at a desired location.

Figure 8:
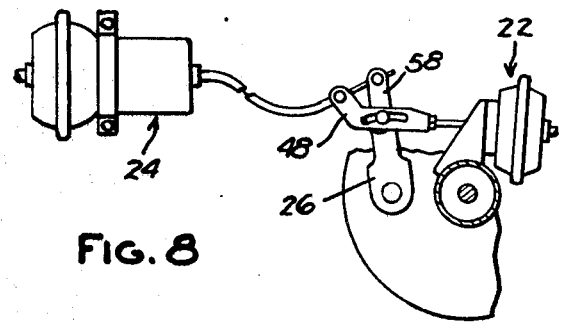
Figure 11:
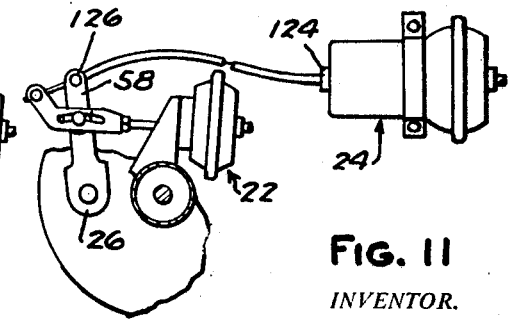

During an extended or unusually severe braking operation the vehicle brakes frequently fade as a result of thermal expansion. The amount of fade may be so great that primary pot 22 may be unable to overcome it even though its piston 40 is advanced to the left to its fullest extent. Under these circumstances air can be valved out of the secondary pot chamber 90 to release piston 84 for movement under the action of spring 94. Cable 110 draws extension 58 and slack adjuster 26 further counterclockwise from the FIG. 6 position to the FIG. 8 position to provide the additional stroke necessary to overcome the brake fade. To release the brakes air under pressure is restored in chamber 90 to permit return of the parts to the condition illustrated in FIG. 6 and then air is relieved from pot 22 to permit further return of the parts to the condition of FIG. 1.

It is sometimes desirable to disassemble secondary pot 24 for servicing or parts replacement. For this purpose air is first valved out of chamber 90 permitting spring 94 to expand until retainer ring 108 abuts shoulder 104 (FIG. 2). Piston 84 is closely adjacent the left end of head 80. Clamp ring 82 is removed permitting removal of the head. Ring 108 and shoulder 104 contain piston plate 88 from being propelled out of the secondary pot housing with explosive force by spring 94.

For further disassembly bolting 100 is detached and cable 110 and sheath 116 are uncoupled from their anchor points 120, 126 respectively. The assembly which comprises piston plate 88, retainer plate 96 and spring 94 may then be removed bodily from secondary pot housing 76. This assembly may be placed in a suitable fixture, ring 108 unthreaded from piston extension 106, and then the spring may be permitted to expand gradually to effect disassembly of the parts. Piston plate 88 can be removed from and reattached to cable fitting 112 by means of threaded connection 114. The parts of the secondary pot may be reassembled by a reverse procedure.

FIG. 5 illustrates system 20 installed on a vehicle in a hook-up different from that of FIG. 1. In FIG. 1 cable 110 is employed as the brake force transmitting element while cable sheath 116 comprises the brake force reaction receiving element. To the contrary in FIG. 5 sheath 116 is used as the brake force transmitting element whereas cable 110 is used as the brake force reaction receiving element. The difference is that in FIG. 5 cable end 118 is connected to link projections 74 by a pivoted anchor 120 while sheath 116 is connected to extension 58 by a pivoted anchor 126.

Figure 9:
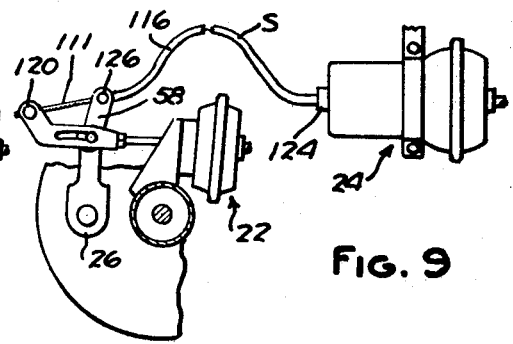
FIGS. 9, 10 and 11 are views illustrating operation of the system when hooked up in accordance with FIG. 5.

The length of cable 110 and sheath 116 is such that when secondary pot 24 is inactive slack S is provided therein as illustrated in FIGS. 5 and 9. When the brake is operated by primary pot 22 alone the behavior of the primary pot, link 48, slack adjuster 26 and extension 58 is similar to the behavior of these parts under the action of primary pot 22 in the FIG. 1 hook-up. FIGS. 1 and 5 show the brake off position; FIGS. 6 and 9 show the on position under the action of primary pot 22.

In FIGS. 5 and 9–11 when secondary pot 24 is actuated piston 84 therein moves to the right. Link 48 holds cable end 118 from movement to the right. Consequently, cable 110 is straightened to take up slack S. This straightening also causes sheath 116 to straighten thereby causing the distance between anchor points 124 and 126 of the sheath to increase. Lever extension 58 is thereby forced counterclockwise carrying slack adjuster 26 bodily with it to apply the brakes.

Figure 10:
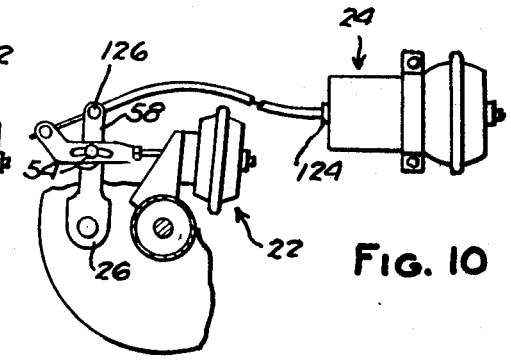

FIG. 10 illustrates the relation of the parts when the secondary pot is used for parking brake purposes and when the secondary pot is actuated under an emergency condition wherein air pressure is lost from the air brake system. FIG. 10 corresponds to FIG. 7. Similarly, FIG. 11 corresponds to FIG. 8 wherein primary pot 22 has been actuated and then secondary pot 24 has been actuated to overcome brake fade. Enough slack S is left in cable 110 and its sheath to permit an initial slack take-up upon actuation of pot 22 and additional slack take-up for further swinging of extension 58 and slack adjuster 26 when the secondary pot is actuated. The brake is returned to off condition by deactuation in the manner described above of whichever pots are in use to apply the brake.

In both the hook-up shown in FIG. 1 and in FIG. 5 the pivoted anchor points 120 and 126 for cable 110 and sheath 116 respectively eliminate bending of the cable and sheath which might otherwise occur upon relative swinging of the slack adjuster, link 48 and extension 58. This protects the strands of cable 110 from being spread and distorted and thereby insures proper brake actuation.

The modified form of the invention shown in FIG. 12 is similar to the form described above except that link 48a is in the form of a rockable lever rather than a linearly movable element on piston rod 46. Lever 48a is provided with a shoulder 134 which in brakes off position abuts the side of slack adjuster 26a. When primary pot 22 is actuated push rod 46 rocks link 48a counterclockwise and shoulder 134 provides a driving connection which rocks slack adjuster 26a for applying the brakes. When the primary pot is deactuated slack adjuster 26a rocks link 48a clockwise in the brakes releasing movement. Otherwise the structure and functioning of the various parts is similar to the form of the invention described above.

In FIG. 12 cable 110 and sheath 116 are illustrated as being hooked up with link 48a and extension 58 similarly to the hook-up in FIG. 1 wherein the cable transmits the brake applying force and sheath 116 receives the reaction thereto. It will be obvious that in this form of the invention the FIG. 5 hook-up can also be used wherein sheath 116 transmits the brake applying force and cable 110 receives the reaction thereto.

I claim:

1. A brake actuating system which comprises, first and second brake actuating motor means adapted to be mounted on a vehicle, a brake actuating element, means operably interconnecting said first motor means and element to effect brake actuating movement of said element, lever means mounted for bodily movement with and for movement relative to said element, means providing a limit to said relative movement in one direction, said lever means being effective responsive to movement thereof in said direction beyond said limit to impart brake actuating movement to said element, means operably interconnecting said second motor means and lever means to effect said movement of said lever means beyond said limit, said lever means responsive to brake actuating operation of said first motor means being urged toward bodily movement to an extent greater than the extent of movement of said element, said greater extent of movement being resisted by said means operably interconnecting said second motor means and lever means when said second motor means is inactive, said lever means being movable in another direction relative to said element responsive to said resistance.

2. The system defined in claim 1 wherein said means operably interconnecting said first motor means and element comprises a link, said means operably interconnecting said second motor means and lever means comprising a brake force transmitting member connected with said motor means and a brake force reaction receiving member connected with said link.

3. The system defined in claim 2 wherein said members comprise a cable and a flexible but longitudinally substantially incompressible sheath in which said cable is slidable.

4. The system defined in claim 3 wherein said cable comprises said force transmitting member and said sheath comprises said reaction receiving member.

5. The system defined in claim 3 wherein said sheath comprises said force transmitting member and said cable comprises said reaction receiving member.

6. The system defined in claim 5 wherein said cable and sheath are in slack, curved condition when said second motor means is inactive, said second motor means being effective to place said cable under tension when actuated, said tension urging said sheath toward straightened condition and thereby causing said sheath to transmit said brake force to said lever means.

7. The system defined in claim 1 wherein said element comprises a lever swingable to actuate a brake, said lever means comprising an extension of said lever, the operable connection of said second motor means to said extension being further removed from lever axis than the operative connection of the first motor means to said lever.

8. The system defined in claim 7 wherein said extension is pivotally secured on said lever.

9. The system defined in claim 8 wherein said means providing said limit comprises a portion of said extension position to engage a portion of said lever, said extension portion being provided with a screw adjustable toward and away from said lever portion and thereby being effective to adjust the relative angular attitudes of said extension and lever at said limit.

10. The system defined in claim 1 wherein said means operably interconnecting said first motor means and element includes a link which is moved in a substantially linear direction by said first motor and which has a pivotal connection with said element, said means operably interconnecting said second motor means and element also including said link.

11. The system defined in claim 10 wherein said means operably connecting said first and second motor means respectively with said link includes means disposed respectively on opposite sides of said pivotal connection.

12. The system defined in claim 1 wherein said means operably interconnecting said first motor means and element includes a lever which is rocked by said first motor means and which has a drive connection with said element, said means operably interconnecting said second motor means and element including said lever.

13. The system defined in claim 12 wherein said lever has a fulcrum disposed between said means operably connecting said first and second motor means therewith.

14. The system defined in claim 13 wherein said element also comprises a lever, said levers having axes which are substantially coincident.

15. A brake actuating system which comprises,
   a brake actuating element constructed and arranged to be operatively connected with a brake mechanism,
   a primary air pot having a housing adapted to be mounted on a vehicle and means in said housing forming a piston,
   a piston rod on said piston which includes means operably connected with said element so that said piston actuates said element upon changes of air pressure in said housing acting upon said piston,
   means providing a lever mounted for bodily movement with said element and for swinging movement relative thereto,
   a secondary air pot having a housing adapted to be mounted on a vehicle and having a piston movable in different directions therein responsive to changes of air pressure in the housing acting upon the piston,
   a cable connected for movement with said secondary piston, said cable having a portion which extends to the exterior of said secondary housing,
   said cable portion being slidable within a flexible but longitudinally substantially incompressible sheath, said sheath being anchored to said secondary housing, said cable and sheath providing two members one of which is connected with said lever and the other of which is connected with said means included by said piston rod,
   means providing a limit to movement of said lever relative to said element in a brake applying direction so that further movement of said lever in said direction bodily moves said element for brake application,
   said one member responsive to actuation of said secondary pot being operable to move said lever beyond said limit and thereby transmit brake applying force from said secondary piston to said element,
   said lever providing a mechanical advantage for increasing the brake applying force exerted by said secondary piston, the connection between said one member and lever responsive to brake actuating operation of the primary pot being urged toward bodily movement to an extent greater than the extent of movement of said element,
   said greater extent of movement being resisted by said members when said secondary pot is inactive,
   said lever being swingable in the other direction relative to said element responsive to said resistance so that said cable remains substantially free of compressive forces.

16. The system defined in claim 15 wherein said means included with said piston rod comprises an extension of said rod having a lateral projection, said other member being anchored on said projection.

17. The system defined in claim 15 wherein said means included with said piston rod comprises a lever which is rocked by said piston rod upon actuation of said primary air pot, said other member being anchored on the latter said lever and being operable to rock the same upon actuation of said secondary air pot.

18. The system defined in claim 8 wherein said means operably interconnecting said second motor means and lever means includes two members one of which is a cable and the other of which is a flexible but longitudinally substantially incompressible sheath in which said cable is slidable,
   one of said members being connected in brake force transmitting relation between said motor means and extension, the other of said members being connected in brake force reaction receiving relation to said motor means, the connection between said one member and extension being pivotable.

19. The system defined in claim 18 wherein a link is provided between said first motor means and other member which supports said other member against brake force reaction received thereby, the connection between said link and other member being pivotable.

References Cited
UNITED STATES PATENTS

| 2,409,908 | 10/1946 | Simpkins | 188—170 X |
| 3,144,812 | 8/1964 | Rager et al. | 91—170 |
| 3,198,086 | 8/1965 | Rager et al. | |

DUANE A. REGER, *Primary Examiner.*